United States Patent
Moon et al.

(10) Patent No.: US 10,933,886 B2
(45) Date of Patent: Mar. 2, 2021

(54) HIERARCHICAL MESSAGING SYSTEM

(71) Applicant: Waymo LLC, Mountain View, CA (US)

(72) Inventors: Maria Moon, Mountain View, CA (US); Hans-olav Cavelie, San Francisco, CA (US); Juliet Rothenberg, San Francisco, CA (US); Julien Mercay, Redwood City, CA (US); Ryan Powell, San Francisco, CA (US); Yang Li, Palo Alto, CA (US)

(73) Assignee: Waymo LLC, Mountain View, CA (US)

(*) Notice: Subject to any disclaimer, the term of this patent is extended or adjusted under 35 U.S.C. 154(b) by 423 days.

(21) Appl. No.: 15/795,903

(22) Filed: Oct. 27, 2017

(65) Prior Publication Data
US 2019/0126937 A1   May 2, 2019

(51) Int. Cl.
| | |
|---|---|
| *B60W 50/08* | (2020.01) |
| *G05D 1/00* | (2006.01) |
| *G01C 21/26* | (2006.01) |
| *B60W 30/00* | (2006.01) |
| *H04L 12/58* | (2006.01) |

(52) U.S. Cl.
CPC ........... *B60W 50/08* (2013.01); *B60W 30/00* (2013.01); *G01C 21/26* (2013.01); *G05D 1/0088* (2013.01); *H04L 51/24* (2013.01); *H04L 51/26* (2013.01); *B60K 2370/1868* (2019.05); *G05D 2201/0213* (2013.01)

(58) Field of Classification Search
None
See application file for complete search history.

(56) References Cited

U.S. PATENT DOCUMENTS

| | | | |
|---|---|---|---|
| 9,272,658 B2 | 3/2016 | Newton-Dunn et al. | |
| 9,381,813 B2 | 7/2016 | Hampiholi et al. | |
| 2013/0038437 A1 | 2/2013 | Talati et al. | |
| 2015/0191122 A1* | 7/2015 | Roy | G08G 1/0962 340/439 |
| 2016/0110618 A1* | 4/2016 | Oba | G06K 9/6215 348/148 |
| 2016/0132058 A1* | 5/2016 | Lee | G05D 1/0214 701/26 |
| 2017/0043664 A1 | 2/2017 | Rajendran | |
| 2018/0012091 A1* | 1/2018 | Ricci | G06Q 30/0637 |
| 2019/0253849 A1* | 8/2019 | Ryder | G06N 20/00 |

\* cited by examiner

*Primary Examiner* — Kelly D Williams
(74) *Attorney, Agent, or Firm* — Botos Churchill IP Law (57) ABSTRACT

Aspects of the present disclosure relate to prioritizing notifications for a vehicle operating in an autonomous driving mode. As an example, a set of notifications based on one or more messages received or transmitted by a planning system of the vehicle may be generated. Each notification of the set of notifications is assigned a priority ranking. The set of notifications may be stored in a cache and the one or more processors may determine a first notification for display based on the priority rankings of the set of notifications and the first notification may be displayed on a display of the vehicle to a passenger of the vehicle.

28 Claims, 11 Drawing Sheets

| 501 Event | 503 Criteria | 505 Visual | 507 Rank (0-5) | 509 Display Time | 511 Expiration Time |
|---|---|---|---|---|---|
| Door Open Before Trip | I. Vehicle Door Open; II. Vehicle Ready To Depart | Please Close The [X] Door So The Trip May Begin | 1 | Until [X] Door is Closed | Indefinite |
| Door Closed | I. Vehicle Door Closed After Door Open Notificaiton | [X] Door Closed | 5 | 5s | 5s |
| Door Open: Vehicle in Motion | I. Vehicle Door Open; II. Vehicle In Motion | For Your Safety, Please Close The [X] Door. | 1 | Until [X] Door is Closed | Indefinite |
| Trip Starting | I. Vehicle Begins Trip | Trip Starting | 2 | 10s | 10s |
| Trip Ending | I. Vehicle a Predetermined Distance From Destination | Approaching Your Destination | 3 | 20s | 60s |
| Route Change | I. Route is Changing While Trip is Progressing | Rerouting Due to [X] | 4 | 10s | 10s |
| Unable to Pullover | I. Pullover Location Unavailable Near Destination | Unable to Pullover, Looking for a New Dropoff Location | 1 | 10s | 10s |
| Dispatch Message | I. Instructions Received From Central Dispatch | [Display Dispatch Message] | N/A | 20s | 45s |
| Vehicle Issue | I. Vehicle Mechanically Compromised | Issue Detected | 0 | Indefinite | Indefinite |

| 501 Event | 503 Criteria | 505 Visual | 507 Rank (0-5) | 509 Display Time | 511 Expiration Time |
|---|---|---|---|---|---|
| Door Open: Before Trip | I. Vehicle Door Open; II. Vehicle Ready To Depart | Please Close The [X] Door So The Trip May Begin. | 1 | Until [X] Door is Closed | Indefinite |
| Door Closed | I. Vehicle Door Closed After Door Open Notificaiton | [X] Door Closed | 5 | 5s | 5s |
| Door Open: Vehicle in Motion | I. Vehicle Door Open; II. Vehicle In Motion | For Your Safety, Please Close The [X] Door. | 1 | Until [X] Door is Closed | Indefinite |
| Trip Starting | I. Vehicle Begins Trip | Trip Starting | 2 | 10s | 10s |
| Trip Ending | I. Vehicle a Predetermined Distance From Destination | Approaching Your Destination | 3 | 20s | 60s |
| Route Change | I. Route is Changing While Trip is Progressing | Rerouting Due to [X] | 4 | 10s | 10s |
| Unable to Pullover | I. Pullover Location Unavailable Near Destination | Unable to Pullover, Looking for a New Dropoff Location | 1 | 10s | 10s |
| Dispatch Message | I. Instructions Received From Central Dispatch | [Display Dispatch Message] | N/A | 20s | 45s |
| Vehicle Issue | I. Vehicle Mechanically Compromised | Issue Detected | 0 | Indefinite | Indefinite |

HIERARCHICAL MESSAGING SYSTEM

BACKGROUND

Autonomous vehicles, for instance vehicles that do not require a human driver, can be used to aid in the transport of passengers or items from one location to another. Such vehicles typically function with little to no passenger input, for instance, only to provide a destination for the vehicle or some other initiating input. Because of this, a passenger would typically not have any understanding of why a vehicle took a particular action other than those which are clearly aimed at maneuvering the vehicle towards the destination. This means that even ordinary movements by the vehicle, even if for safety or other reasons, can cause anxiety or stress for the passenger.

To reduce or avoid such discomfort, the vehicle's computing devices may generate and display notifications on an internal display of the vehicle in order to provide the passenger with a greater sense of understanding and safety while being driven.

BRIEF SUMMARY

One aspect of the disclosure provides a method of prioritizing notifications for a vehicle operating in an autonomous driving mode. The method includes generating, by a one or more processors, a set of notifications based on one or more messages received or transmitted by a planning system of the vehicle, wherein each notification of the set of notifications is assigned a priority ranking; storing the set of notifications in a cache; determining, by the one or more processors, a first notification for display based on the priority rankings of the set of notifications; and displaying on a display of the vehicle the first notification to a passenger of the vehicle.

In one example, the one or more messages include data representing functions or operations being performed by the vehicle. In another example, the generation of each notification of the set of notifications is further based upon the one or more processors determining an event occurred. In some instances, the event is defined by one or more criterion, and determining that the event occurred includes identifying the one or more messages include data which satisfy the one or more criterions.

Each notification of the set of notifications may include one or more of a visual component, a display time, and an expiration time. In some examples, the generation of each notification of the set of notifications is further based upon the one or more processors determining an event occurred and wherein the visual component of at least one of the notifications in the set of notifications includes text or images associated with an object or individual which performed the event. The visual component may include text or images for display on the display of the vehicle. The display time may be the length of time the respective notification is displayed. The expiration time may be the length of time the respective notification is stored in the cache.

The method may also include generating a second notification, the second notification having a higher priority ranking than the first notification; and displaying the second notification on the display before the display time of the first notification is completed. The method may further include removing the first notification from the cache upon the first notification being displayed. Determining a first notification for display may be based on the priority rankings of the set of notifications includes determining that the first notification for display has a higher priority ranking than the priority rankings of the other notifications in the set of notifications. The method may further include monitoring, by the one or more processors, the one or more messages received or transmitted by the planning system of the vehicle.

Another aspect of the disclosure provides a system for a vehicle operating in an autonomous driving mode. The system comprising one or more processors configured to: generate a set of notifications based on one or more messages received or transmitted by a planning system of the vehicle, wherein each notification of the set of notifications is assigned a priority ranking; store the set of notifications in a cache; determine a first notification for display based on the priority rankings of the set of notifications; and display on a display of the vehicle the first notification to a passenger of the vehicle.

DETAILED DESCRIPTION

Overview

Aspects of the technology relate to selectively providing passengers with information about the operation and status of autonomous vehicles or vehicles throughout the stages of a trip. As noted above, notifications may be provided to the passengers of the vehicle, to provide them with a greater sense of understanding and safety while being driven. However, in some instances, the volume of notifications generated by the vehicle's computing devices may be large, and providing too many notifications can be annoying, disturbing, uncomfortable, or even overwhelming to passengers. To address this, notifications may be selectively displayed to ensure the passenger that the vehicle is operating properly without providing too many notifications.

In order to generate these notifications, the vehicle's notification system must first be able to identify relevant events for notification generation based on data received from the vehicle's other computing devices. Doing so may involve monitoring, by the vehicle's notification system, data generated by the other computing devices, regarding the vehicle's operation. Such data may include messages sent to and from the vehicle's planner system, which is in communication with the different systems and computing devices of the vehicle.

Notifications may be generated upon determining an event associated with the vehicle has occurred. Such events may include functions or operations being performed by the vehicle. The events may be defined by one or more criterion which, when met, may trigger the notification system to generate a notification associated with the event. The one or more criterion associated with an event may be satisfied by data contained in one or more of the monitored messages sent by one or more of the computing devices.

Each notification may include one or more components. For instance, notifications may include components such as a visual message, a rank, a display time, and/or an expiration time.

The visual message components of a notification may include text and/or images for display on the vehicle's display to inform the passenger about the event which triggered the notification. To provide further context to the notification, the visual message may include information specific to the event which has occurred.

To assure the vehicle's passengers are shown relevant notifications, each generated notification may be stored within a cache and prioritized based on a ranking assigned to the respective notification. In this regard, each generated notification may be classified with a ranking, or into a bucket of a particular ranking, in accordance with their importance.

As noted above, each notification may include a display time component which may define the length of time the notification is to be displayed. In some instances, a notification may be programmed to be displayed indefinitely, such as in the case of a notification of a vehicle's mechanical failure. In some instances, a user may cause a notification to be removed from the display, such as by "swiping" the notification off of the display or otherwise providing user input that indicates the notification should be removed from the display.

Notifications having a certain rank may override the display time of a currently displayed notification. In this regard, a notification may be replaced on the display prior to its respective display time expiring should the higher ranking notification be generated before the display time expires.

Notifications may also include an expiration time to assure relatively recent and relevant notifications are displayed. In this regard, the expiration time of a notification may define how long the notification may remain in the cache before it is removed without being displayed.

Some messages or data in those messages may become stale, or rather, no longer useful to the passenger prior to the expiration time expiring. These stale messages may be discarded from the cache or otherwise ignored by the notification system upon a predetermined about of time passing since the message was received or upon a subsequent message being received.

The features described above, may allow computing devices of an autonomous vehicle to provide relevant notifications to passengers of a vehicle. Because these notifications are happening in real time, they can provide a sense of reassurance and safety to the passenger. The features described above may also allow for a large amount of information regarding the operation of an autonomous vehicle to be presented to passengers of the vehicle into a reasonable number of notifications which provide the most appropriate and important information to the passengers. These notifications may also be provided to the passengers at an appropriate and relevant time.

Example Systems

Figure 1:
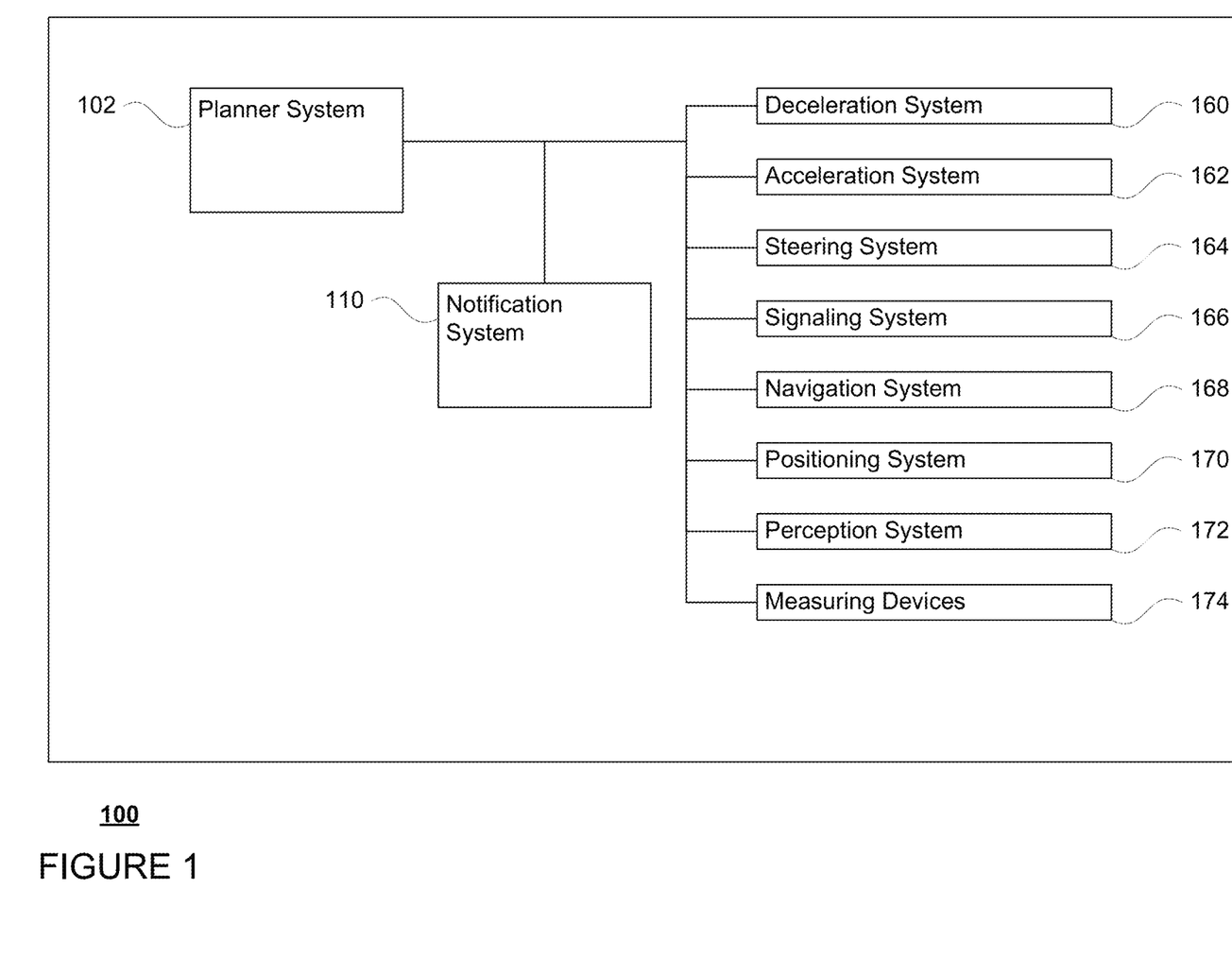
FIG. 1 is a functional diagram of an example vehicle in accordance with an exemplary embodiment.
Figure 2:
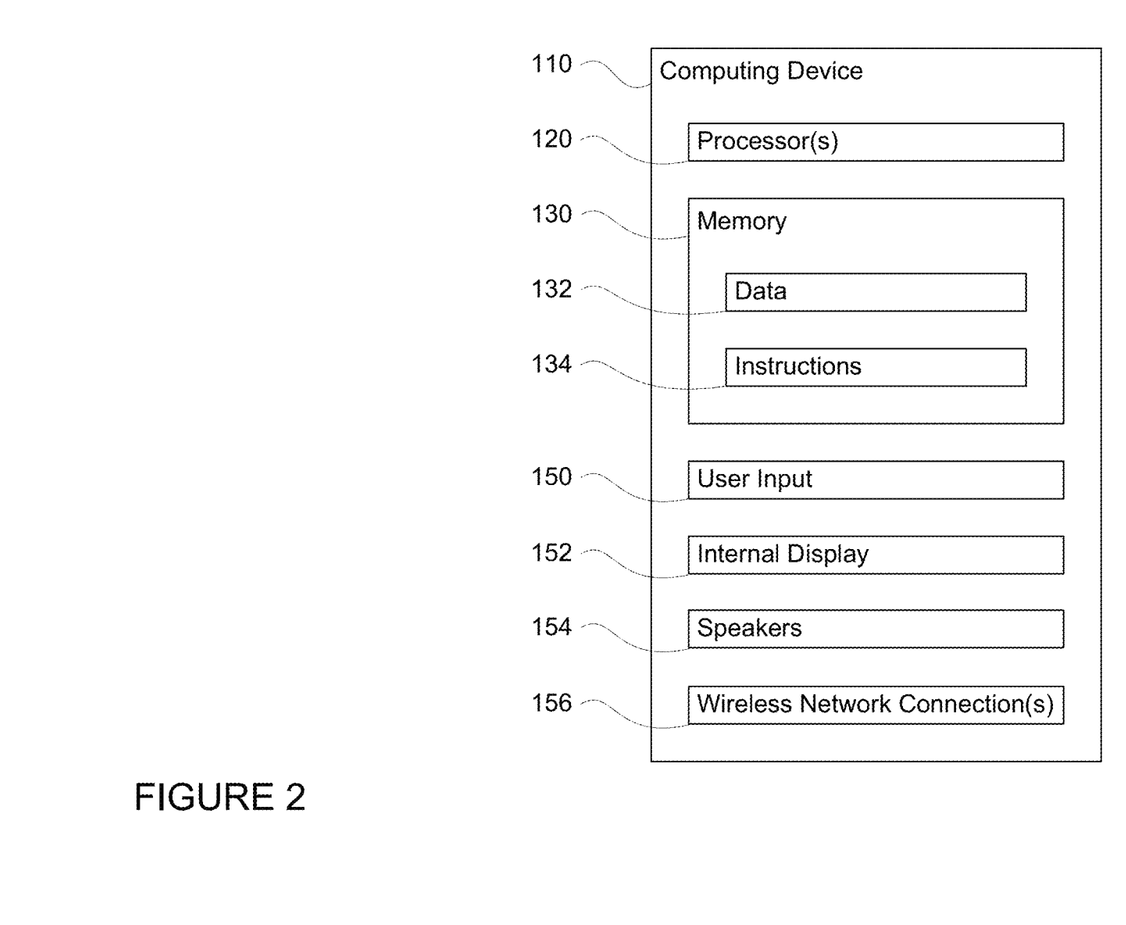
FIG. 2 is a functional diagram of an example system in accordance with an exemplary embodiment.

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices as shown in FIG. 2.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The data 132 may store events and components in association with notifications. In this regard, and as described further herein, notifications may be associated with events, which when met, cause the vehicle to generate the respective notification. Each event may be predefined based on functions or operations being performed, or instructions received by the vehicle. The events may be defined by one or more criterion which, when met, may trigger the notification system 110 to generate a notification associated with the event. Each notification may be generated based on the components stored in association with the respective notification, such as visual message, rank, display time, and expiration time, as described further herein.

The one or more processor 120 may be any conventional processors, such as commercially available CPUs. Alternatively, the one or more processors may be a dedicated device such as an ASIC or other hardware-based processor. Although FIG. 2 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110.

Accordingly, references to a processor or computing device will be understood to include references to a collection of processors or computing devices or memories that may or may not operate in parallel.

Computing device 110 may function as a notification system in order to generate and provide information to a passenger of the vehicle 100. In this regard, the computing device 110 and/or other systems or computing devices of the vehicle may include an internal display 152 to provide visual information as well as one or more speakers 154 to provide audible information. In this regard, internal display 152 may be located within a cabin of vehicle 100 and may be used by a planner system 102 to provide information to passengers within the vehicle 100.

Computing device 110 may be able to monitor information or messages sent by different systems of vehicle 100. As will be understood, each of these systems, including, for example, planner system 102, deceleration system 160, acceleration system 162, steering system 164, signaling system 166, navigation system 168, positioning system 170, and perception system 172 may include one or more processors and memory storing data and instructions configured as described above with regard to processors 120, memory 130, data 132, and instructions 134.

Computing device 110 may monitor information sent and received by the planner system 102. In this example, planner system 102 may be part of an autonomous driving computing system incorporated into vehicle 100 configured to communicate with different systems and computing devices of the vehicle. For example, returning to FIG. 1, planner system 102 may be in communication with various systems of vehicle 100, such as deceleration system 160, acceleration system 162, steering system 164, signaling system 166, navigation system 168, positioning system 170, and perception system 172 in order to control the movement, speed, etc. of vehicle 100. In addition, the vehicle may include one or more measuring devices 174, such as accelerometers, gyroscopes, and/or speedometers, not shown, that can provide feedback about the current status of the vehicle to the planner system 102 in order to allow the computing device to correct for errors and make adjustments accordingly. Again, although these systems are shown as external to planner system 102 and computing device 110, in actuality, these systems may also be incorporated into planner system 102 and computing device 110, again as part of an autonomous driving computing system for controlling vehicle 100.

As an example, planner system 102 may interact with one or more actuators of the deceleration system 160 and/or acceleration system 162, such as brakes, the engine or motor of the vehicle, in order to control the speed of the vehicle. Similarly, one or more actuators of the steering system 164 may be used by planner system 102 in order to control the direction of vehicle 100. For example, if vehicle 100 is configured for use on a road, such as a car or truck, the steering system may include components to control the angle of wheels to turn the vehicle. Signaling system 166 may be used by planner system 102 in order to signal the vehicle's intent to other drivers or vehicles, for example, by lighting turn signals or brake lights when needed.

Navigation system 168 may be used by planner system 102 in order to determine and follow a route to a location. In this regard, the navigation system 168 and/or data 132 may store detailed map information, e.g., highly detailed maps identifying the shape and elevation of roadways, lane lines, intersections, crosswalks, speed limits, traffic signals, buildings, signs, real time traffic information, pull over spots vegetation, or other such objects and information.

Positioning system 170 may be used by planner system 102 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with planner system 102, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the planner system 102, other computing devices and combinations of the foregoing.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by planner system 102. In the case where the vehicle is a small passenger vehicle such as a car, the car may include a laser or other sensors mounted on the roof or other convenient location.

The planner system 102 may control the direction and speed of the vehicle by communicating with the various systems and components of the vehicle. By way of example, planner system 102 may navigate the vehicle to a destination location completely autonomously using data from the detailed map information and navigation system 168. Planner system 102 may use the positioning system 170 to determine the vehicle's location and perception system 172 to detect and respond to objects when needed in order to generate a short term plan for maneuvering the vehicle in order to reach the destination location safely. In order to do so, planner system 102 may generate and send instructions that cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, planner system 102 may also control the drivetrain of the vehicle in order to maneuver the vehicle autonomously.

FIGS. 3A-3D are example, external views of a first configuration for vehicle 100. As can be seen in these figures, vehicle 100 includes many features of a typical vehicle such as headlights 302, windshield 303, taillights/turn signal lights 304, rear windshield 305, doors 306, side view mirrors 308, tires and wheels 310, and turn signal/parking lights 312. Headlights 302, taillights/turn signal lights 304, and turn signal/parking lights 312 may be associated the signaling system 166. Light bar 307 may also be associated with the signaling system 166.

Vehicle 100 also includes sensors of the perception system 172. For example, housing 314 may include one or more laser devices for having 360 degree or narrower fields of view and one or more camera devices. Housings 316 and 318 may include, for example, one or more radar and/or sonar devices. The devices of the perception system may also be incorporated into the typical vehicle components, such as taillights/turn signal lights 304 and/or side view mirrors 308. Each of these radar, camera, and lasers devices may be associated with processing components which process data from these devices as part of the perception system 172 and provide sensor data to the planner system 102.

Figure 3A:
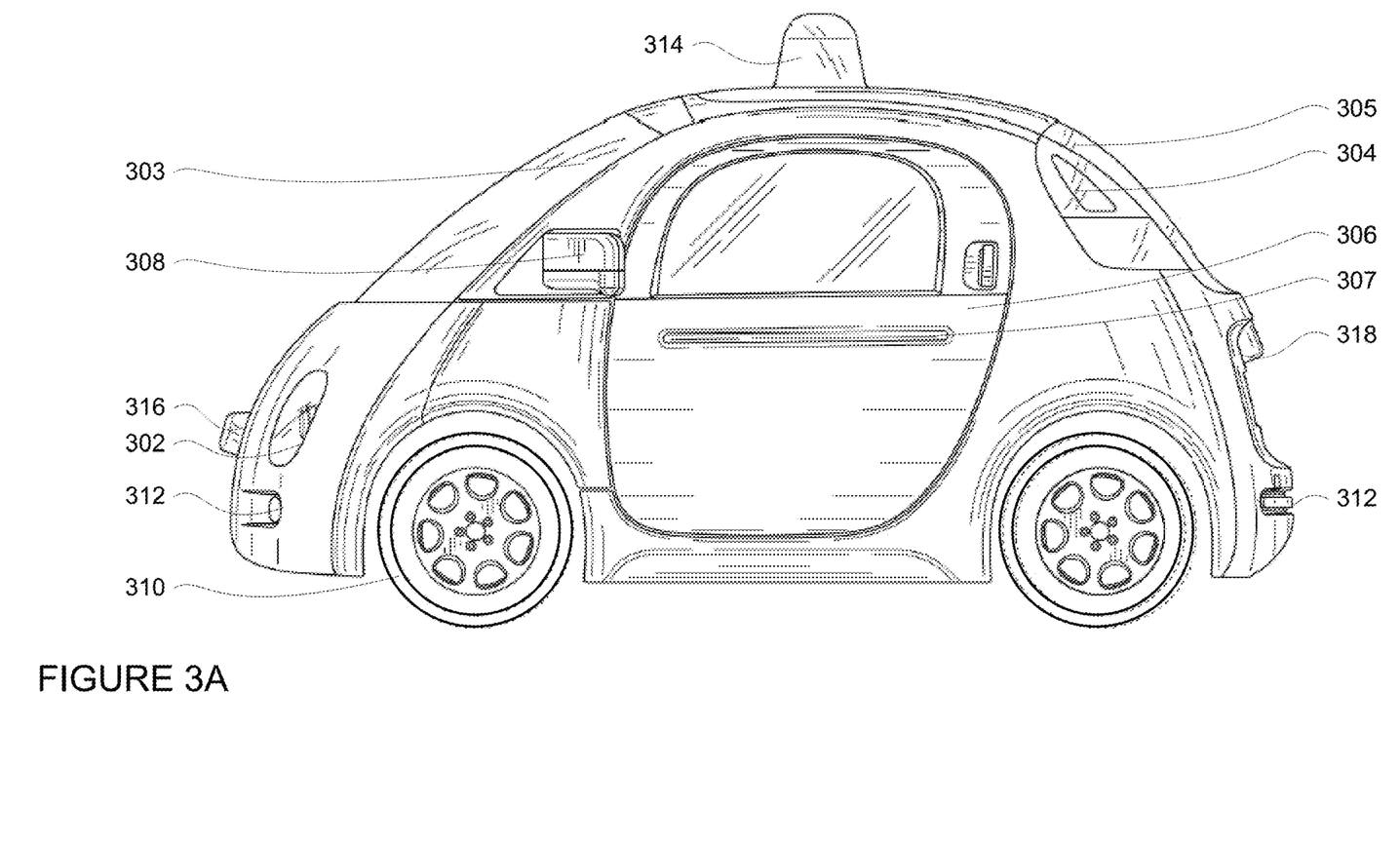
FIGS. 3A-3D are example external views of a vehicle in accordance with aspects of the disclosure.
Figures 3B, 3C:
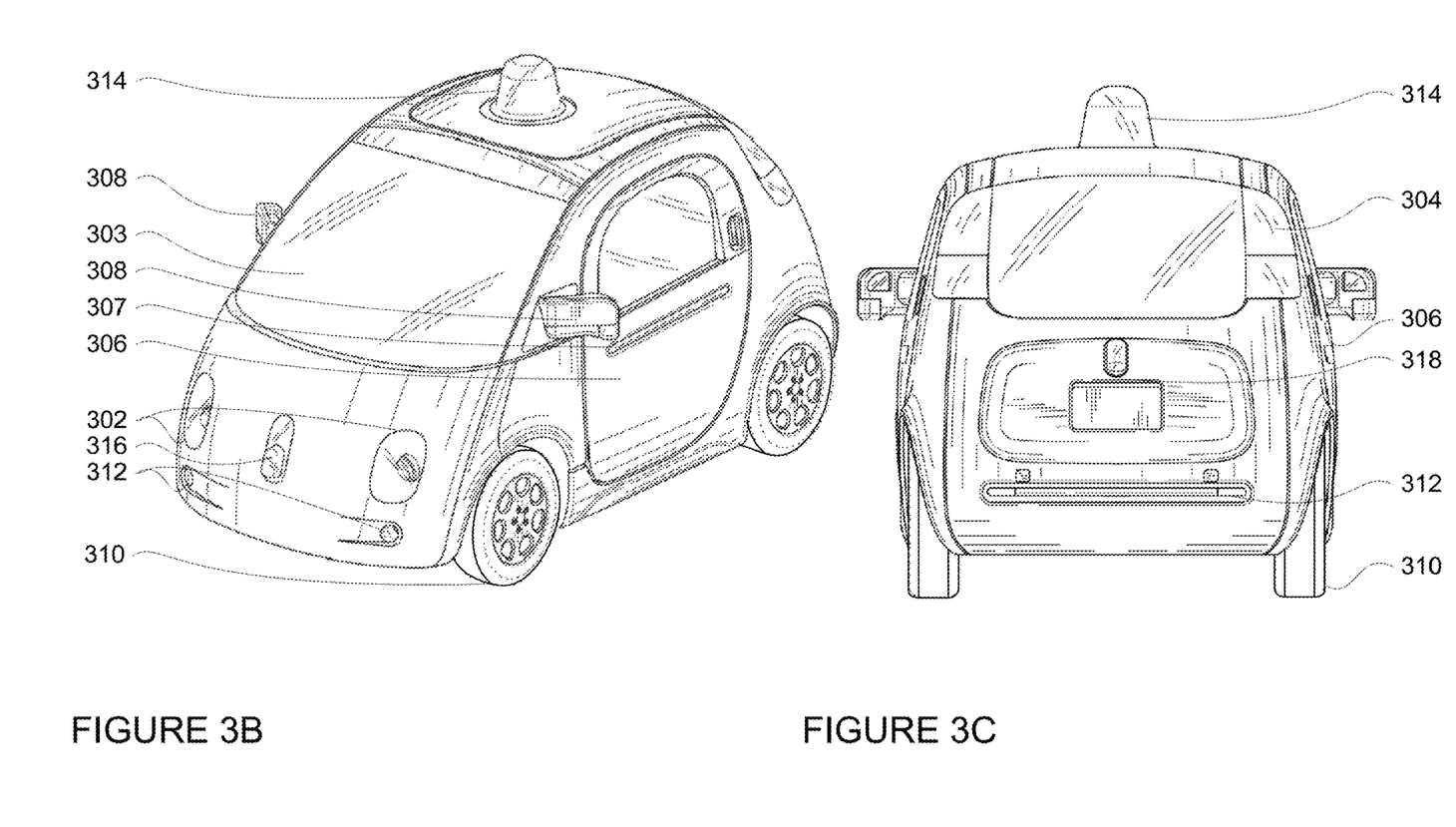
Figure 3D:
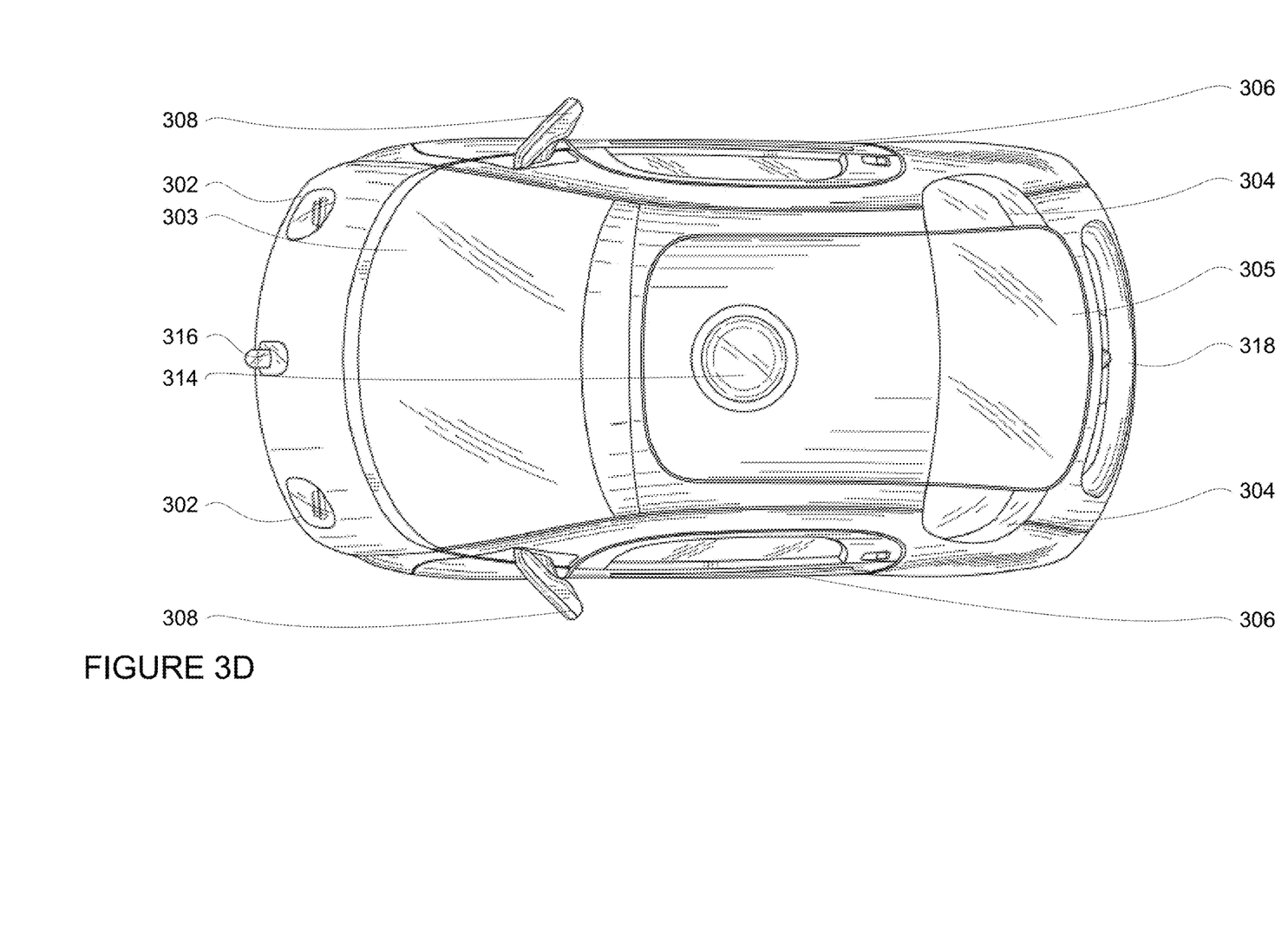
Figure 3E:
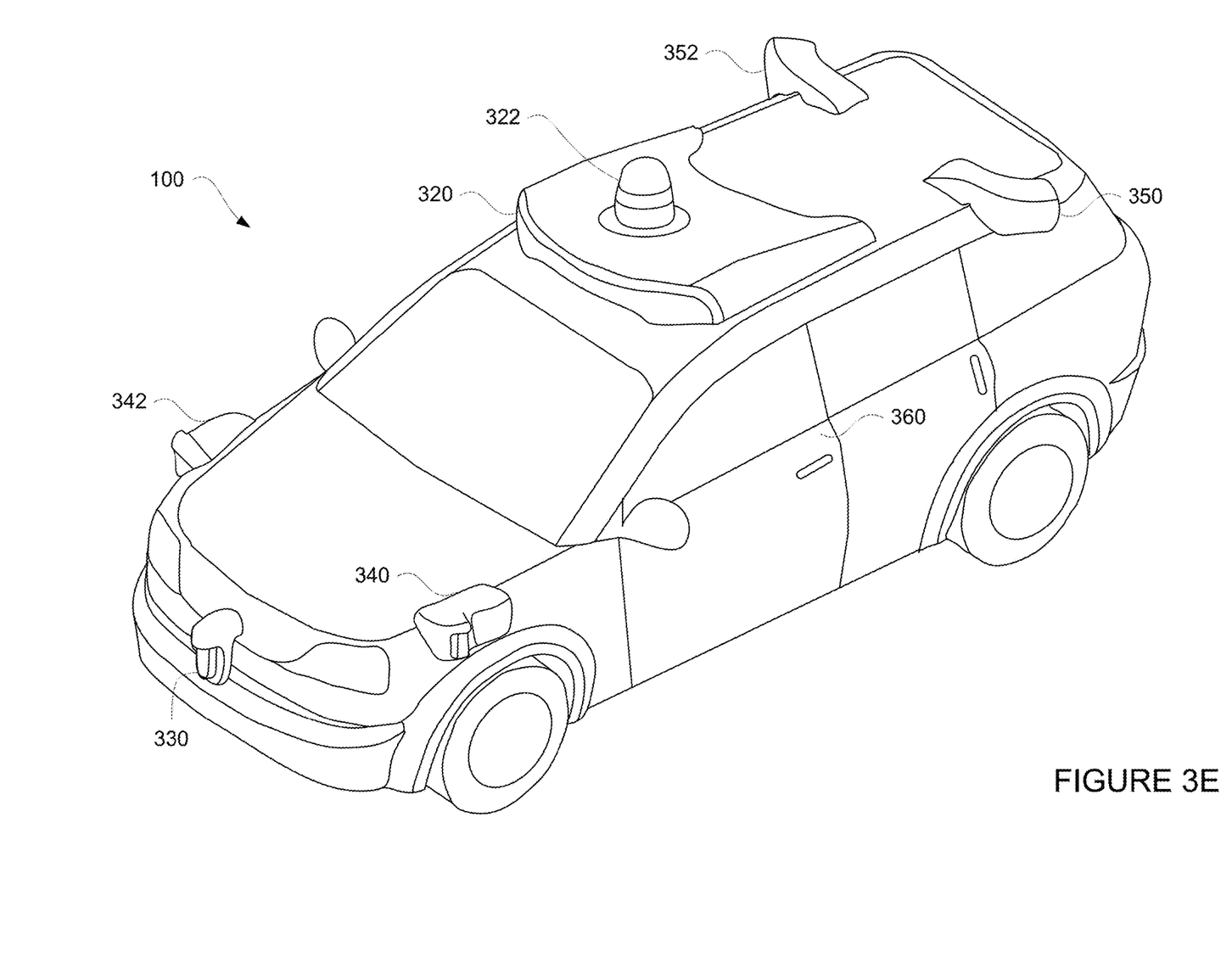
FIG. 3E is an example external view of a vehicle in accordance with aspects of the disclosure.

FIG. 3E is a second example configuration for vehicle 100. In this example, roof-top housing 320 and dome housing 322 may include a lidar sensor as well as various cameras and radar units. In addition, housing 330 located at the front end of vehicle 100 and housings 340, 342 on the driver's and passenger's sides of the vehicle may each store a lidar sensor. For example, housing 340 is located in front of driver door 360. Vehicle 100 also includes housings 350, 352 for radar units and/or cameras also located on the roof of vehicle 100. Additional radar units and cameras (not shown) may be located at the front and rear ends of vehicle 100 and/or on other positions along the roof or roof-top housing 320.

The one or more computing devices 110 of vehicle 100 may also receive or transfer information to and from other computing devices, for instance using wireless network connections 156. The wireless network connections may include, for instance, BLUETOOTH®, Bluetooth LE, LTE, cellular, near field communications, etc. and various combinations of the foregoing.

Figure 4:
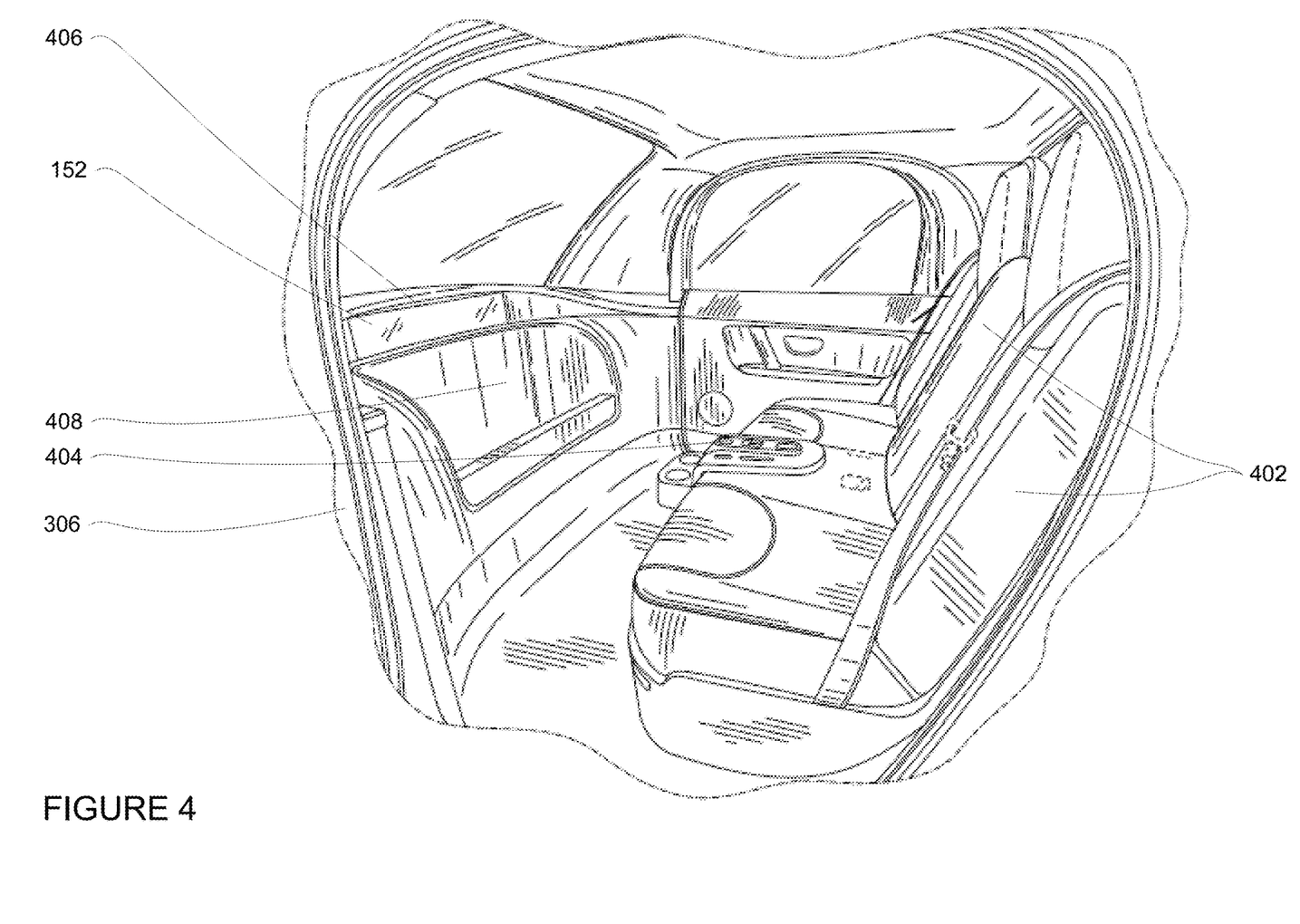
FIG. 4 is an example interval view of a vehicle in accordance with aspects of the disclosure.

FIG. 4 is an example internal view of vehicle 100 through the opening of door 306. In this example, there are two seats 402 for passengers with a console 404 between them. Directly in ahead of the seats 402 is a dashboard configuration 406 having a storage bin area 408 and the internal display 152. As can be readily seen, vehicle 100 does not include a steering wheel, gas (acceleration) pedal, or brake (deceleration) pedal which would allow for a semi-autonomous or manual driving mode where a passenger would directly control the steering, acceleration and/or deceleration of the vehicle via the drivetrain. Rather, user input is limited to a microphone of the user input 150 (not shown), features of the console 404, and wireless network connections 156. In this regard, internal display 152 merely provides information to the passenger and need not include a touch screen or other interface for user input. In other embodiments, the internal display 152 may include a touch screen or other user input device for entering information by a passenger such as a destination, etc.

Figure 5:
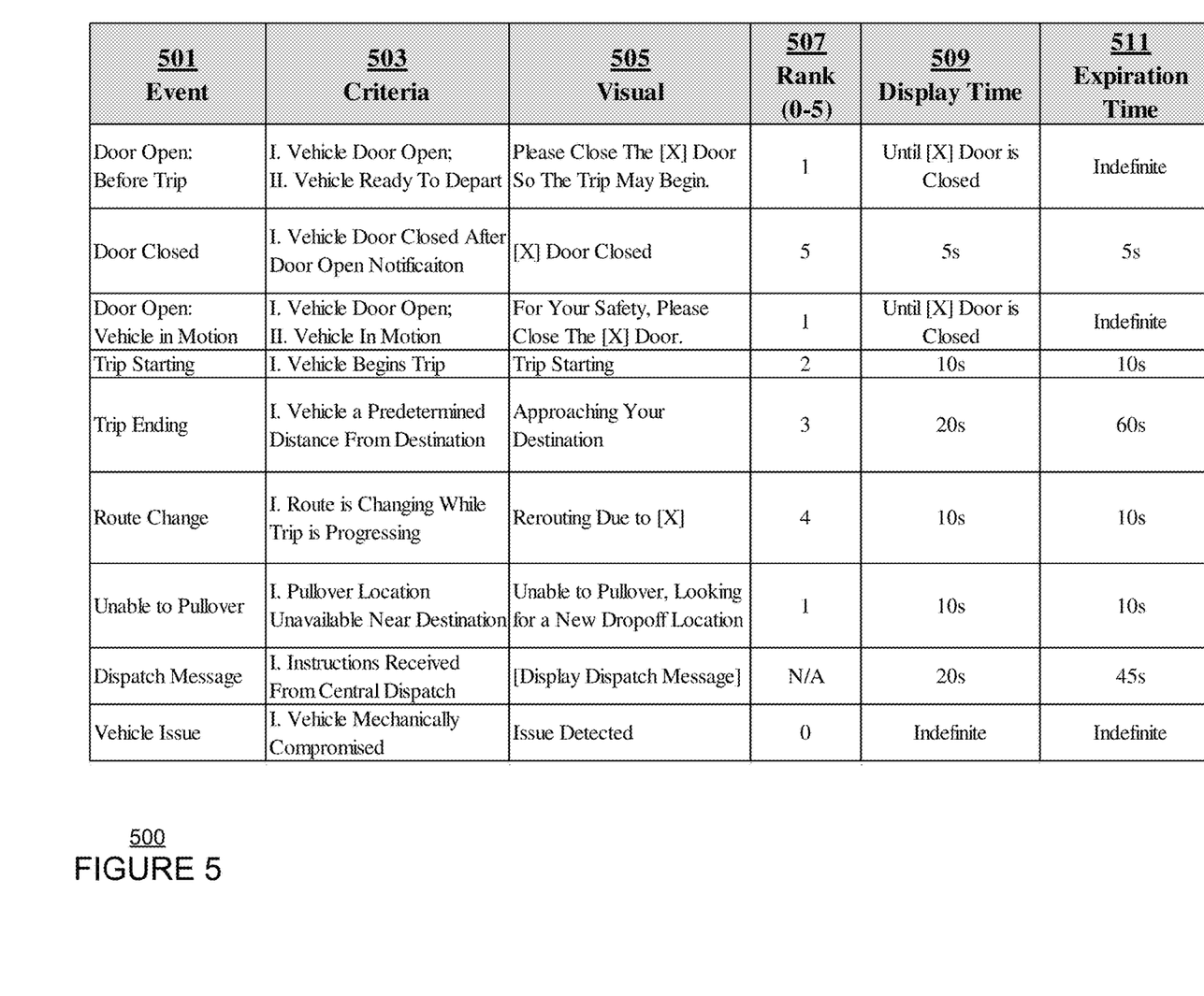
FIG. 5 is a table of notification events, criteria, and components associated with notifications in accordance with aspects of the disclosure.

Data 134 of memory 130 may store information that can be used by the notification system 110 to generate notifications for events. Events may include functions or operations being performed by the vehicle and/or a third party, such as the vehicle reaching particular thresholds, the vehicle performing certain actions, and/or the vehicle receiving instructions from a third party, such as a system dispatcher or customer support. For instance, FIG. 5 shows a table 500 of events 501, event criteria 503, and components associated with notifications 505-511. Each row of the table represents a notification with each column being an event or component associated with the respective notification of a corresponding row. As shown in table 500 events 501 may include the vehicle's door, such as door 306, being open before a trip, the door being closed, the door opening while the vehicle 100 is in motion, a trip starting, a trip ending, a route change occurring, the vehicle being unable to pullover, the vehicle receiving a dispatch message from an operator, a vehicle issue arising, etc. Each event 501 may be defined by one or more criterion 503 which, when met, may trigger the notification system 110 to generate a notification associated with the event. Further details of the table 500 are discussed further below.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

The planner system 102 may maneuver the vehicle 100 between two locations as described above. As part of this, the planner system 102 may also use information from the navigation system to identify a route to follow in order to reach a destination. While following the route to the destination, the vehicle may include one or more passengers. As noted above, it may be both important and useful to provide information to such passengers indicating why autonomous vehicles or vehicles operating in an autonomous driving mode performed a particular action. In this regard, computing device 110 may function as a notification system, generating and displaying notifications for certain events on an internal display, such as internal display 152, of the vehicle in real time in order to provide the passenger with a greater sense of understanding and safety while being driven to the destination.

The notification system 110 must first be able to identify relevant events for notification generation based on data received from the vehicle's other computing devices. Doing so may involve monitoring by the vehicle's notification system data regarding the vehicle's operation including data representing the vehicle's past, present, and future operation generated by the other computing devices. Such data may include messages sent to and from the vehicle's planner system 102, which is in communication with the different systems and computing devices of the vehicle, such computing devices 160-174, shown in FIG. 1. For instance, the notification system 110 may monitor from the perception system 172 to the planner system 102, messages from the planner system 102 to the acceleration system, messages from the planner system 102 to the deceleration system, messages from the planner system 102 to the steering system, and vice versa. In some instances, if the messages are sent over an Ethernet or CAN bus direct wiring or other means, the notification system 110 may be connected to the Ethernet or CAN bus, wiring, etc. in order to allow for the monitoring.

Based on the monitoring, the notification system 110 may determine whether the messages include data that would be considered an event for which a notification should be generated. This may include first determining any criterion associated with the message and thereafter determining whether the identified criterion satisfy any event. For instance, as indicated in the table 500 of FIG. 5, upon the notification system 110 receiving a message from the planner system 102 indicating that a trip is beginning the notification system 110 may determine that the message corresponds to the "Vehicle Begins Trip" criterion or that the "Vehicle Begins Trip" criterion has been satisfied. Using the table 500, the notification system 110 may also determine that all of the criteria, here the "Vehicle Begins Trip" criterion, for the "Trip Starting" event have been satisfied. The notification system may then generate a notification associated with the "Trip Starting" event.

Criteria associated with an event may be satisfied by data contained in more than one message. As an example, a first message may include data indicating that the vehicle 100 is waiting to depart on a trip, and a second message indicating that the vehicle's left passenger door is open. The notification system 110 may determine that these messages individually each correspond to the "Vehicle Door Open" and "Vehicle in Motion" criteria. The notification system 110 may then determine that two criteria associated with the "Door Open: Before Trip" event have been satisfied.

Each generated notification may include one or more components. For instance, the each notification may have one or more of a visual message component 505, a ranking component 507, a display time component 509, and an expiration time component 511. The visual message may include text and/or images for display on the vehicle's display to inform the passenger about the event which triggered the notification. For instance, the notification associated with the start of a ride may include the visual message of "Trip Starting."

The visual message component 505 may include information specific to the event which has occurred, to provide the passengers with further context to the notification. In this regard, the visual message component of a notification may include text and/or images for display on the vehicle's display to inform the passenger about the event which triggered the notification. For instance, as shown in table 500, a visual message component 505 of the notification associated with the trip ending may include a text message which states "Approaching Your Destination."

In some instances, information regarding the specifics of an action which satisfied a criterion 503 of an event associated with a notification may be used to supplement a visual message component 505 of the notification. For instance, a notification may be generated to inform the passengers that a door was closed. In this regard, the notification system 110 may receive a message indicating that "the right passenger door" was closed. Based on this message, the notification system may generate a notification to inform the passenger that a vehicle door was closed, as the "Door Closed" event's criterion was satisfied. To provide the passenger with specific information, the notification may include visual message information which indicates which door was closed— in this example, the "right passenger" door. Thus, in this example, the visual message component is "Right Passenger Door Closed", where the specific information replaces the "[X]" shown in table 500 of FIG. 5.

Figure 6:
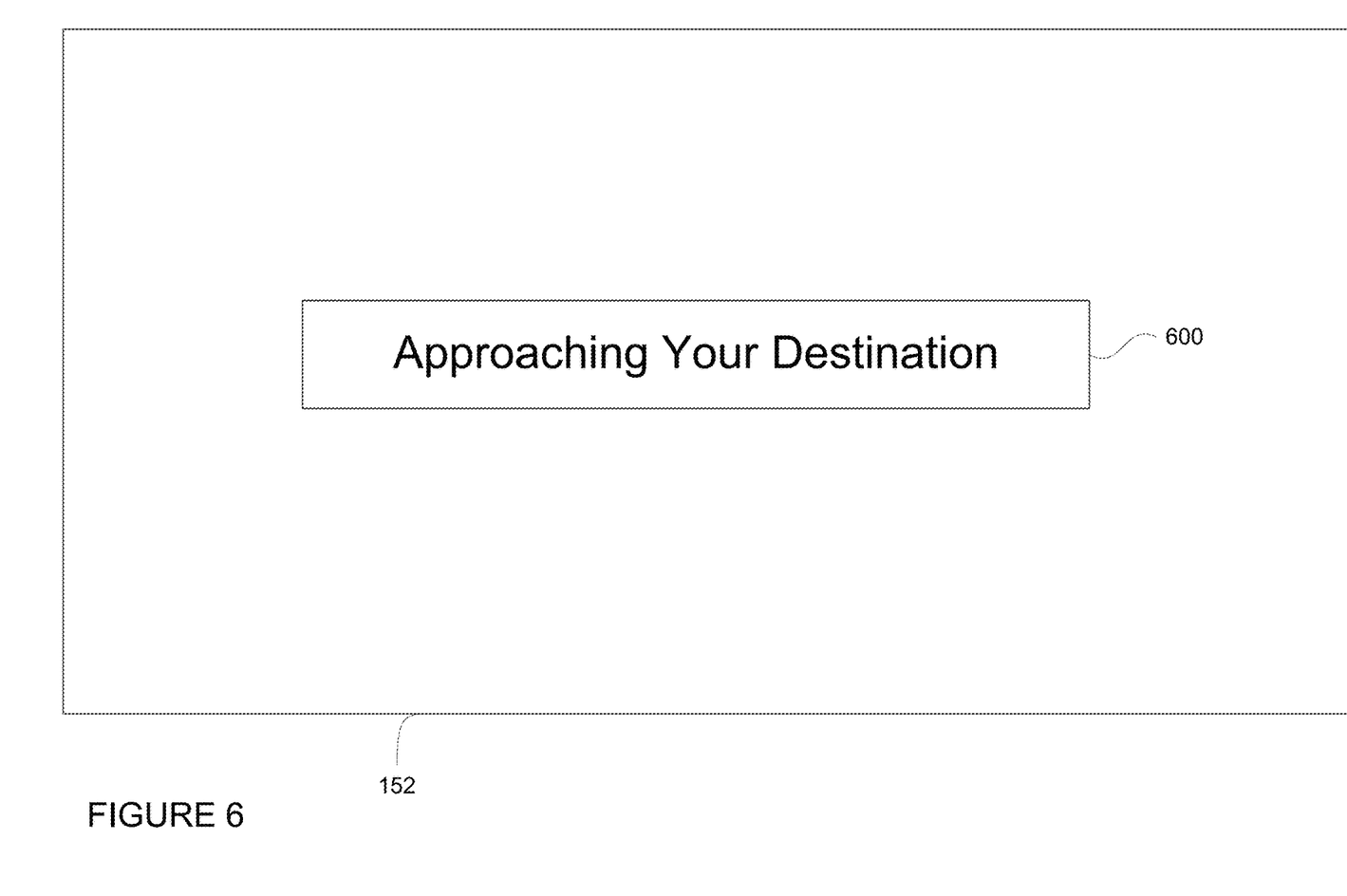
FIG. 6 is an example display including a notification in accordance with aspects of the disclosure.

Each generated notification may be stored in a cache. The cache may be within the memory 130. Each generated notification may then be retrieved from the cache by the notification system 110 for display, such as on the vehicle's display 152. For example, notification 600 "Approaching Your Destination", as shown in FIG. 6, was pulled from the cache by the notification system 110 and displayed on display 152. In some instances the cache may function as a queue in which notifications are arranged.

The notifications stored within the cache may be prioritized based on ranks assigned to the notifications to provide passengers with more relevant notifications before less relevant notifications. In this regard, each notification generated by the notification system may be assigned a ranking in accordance with the importance of that notification. More important notifications may therefore take priority over notifications of less importance or lower priority. In other words, more important notifications may be assigned with a ranking, having priority over the rankings which are assigned to less important notifications. Similarly, each notification may be assigned to one of a plurality of buckets, where each bucket is defined by a priority. For instance, more important notifications may be assigned to a bucket defined by a high priority, while less important notifications may be assigned to buckets having a lower priority.

For instance, as shown in FIG. 5, the rankings 507 may be a 0-5 scale, with high priority notification being assigned as a 0 and low priority notification being assigned as a 5, or vice versa (e.g., a low priority notification may be assigned with a 0 rank and a high priority notification may be assigned with rank 5). Other notifications, having varying levels of intermediate priority may be ranked from 1-4. Although a 0-5 scale is shown in the table 500 of FIG. 5, any scale may be used, such as 1-10, 0.0-1, A-E, etc.

Notifications with a higher priority may be displayed prior to the display of lower priority notification. In this regard, regardless of when the notifications were generated, higher priority notifications may be displayed before lower priority rankings. In other words, notifications assigned with a rank, or to a bucket, with a high priority may be displayed before notifications assigned with a rank or to a bucket, with a low priority regardless of when the notifications were generated. For instance, referring again to the table of FIG. 5, a notification generated based on the event of a door opening while the vehicle is in motion receives a high priority of 1 and a notification generated based on the event of a route change occurring receives a lower priority of 4. As such, a notification requesting a passenger close the open door may be selected from the cache and displayed before a notification informing the passengers of the route change is selected from the cache and displayed. In the event two notifications have been assigned the same rank, or to the same bucket, the notification generated first in time may be displayed first or before the later generated notification, or vice-versa.

As noted above, each notification may include a display time component which may include the length of time the notification is to be displayed. In this regard, a notification may be programmed to be displayed for a preset time period defined by the display time 509, until a criteria is met, and/or indefinitely. For instance, referring again to table 500 of FIG. 5, a notification associated with the event "Door Open: Before Trip" may be programmed to remain displayed until the open door is closed. In another example, in table 500, a notification reporting a vehicle issue may be programmed to be displayed indefinitely, such as in the case of a notification of a vehicle's mechanical failure. Such indefinite notifications may be cancelled by a technician or dispatcher. In yet another example of table 500, a notification informing passengers that a trip is ending may be programmed to be displayed for a preset time period of 20 s. In some instances, a user may cause a notification to be removed from the display, such as by "swiping" the notification off of the display or otherwise providing user input that indicates the notification should be removed from the display. In certain instances, a dispatcher or other such third party may cause the vehicle display system to remove a notification.

Notifications assigned to a higher rank may override the display time of a currently displayed notification. For instance, the notification with a ranking of 5 that informs the passengers that a door was closed is programmed to be displayed for 5 seconds, as shown in table 500. However, after being displayed for two seconds, a second, higher priority notification regarding a route change may be generated and placed in the cache. To assure the passenger received the second, higher priority notification the notification system 110 may override the display time of the first notification and immediately display the second notification.

In some instances notifications may have a minimum display time. In this regard, some or all notifications which are displayed on the vehicle's display 152 may have a time period during which another notification may not override its display so to avoid notifications from disappearing too quickly and confusing passengers. For instance, continuing the previous example, the lower ranked first notification may have a minimum display time of 3 seconds. As such, the higher priority ranked second notification may not override the first notification until the first notification has been displayed for at least 3 seconds. Although the foregoing example uses 3 seconds as the minimum display time, any time may be used.

Notifications within the cache may also include an expiration time component to assure relatively recent and/or relevant notifications are displayed. In this regard, the expiration time 511, as further shown in FIG. 5, indicates how long a notification may remain in the cache before it is removed. For instance, a notification generated based on the event of "Door Closed" occurring, may remain in the cache for only 5 seconds. In the event another notification is being displayed for the 5 seconds from the generation of the notification for the event of "Door Closed," the notification may be removed from the cache without being displayed.

Before being displayed to a passenger, some messages or data in those messages may become stale, or rather, no longer useful to the passenger. These messages may be discarded or otherwise ignored by the notification system upon a predetermined about of time passing since the message was received or upon a subsequent message being received. For instance, the notification system may receive a first message including data indicating that the vehicle is waiting to depart on a trip, a second message indicating that the vehicle has departed, and a third message indicating that the vehicle's right passenger door is open. In this instance, if not yet displayed, the notification system 110 may mark the data within the first message as stale, since the vehicle departed and is no longer waiting to depart. As such, the first message may be discarded or ignored. In some instances, messages older than a predefined time period may be considered stale and discarded and/or ignored.

Figure 7:
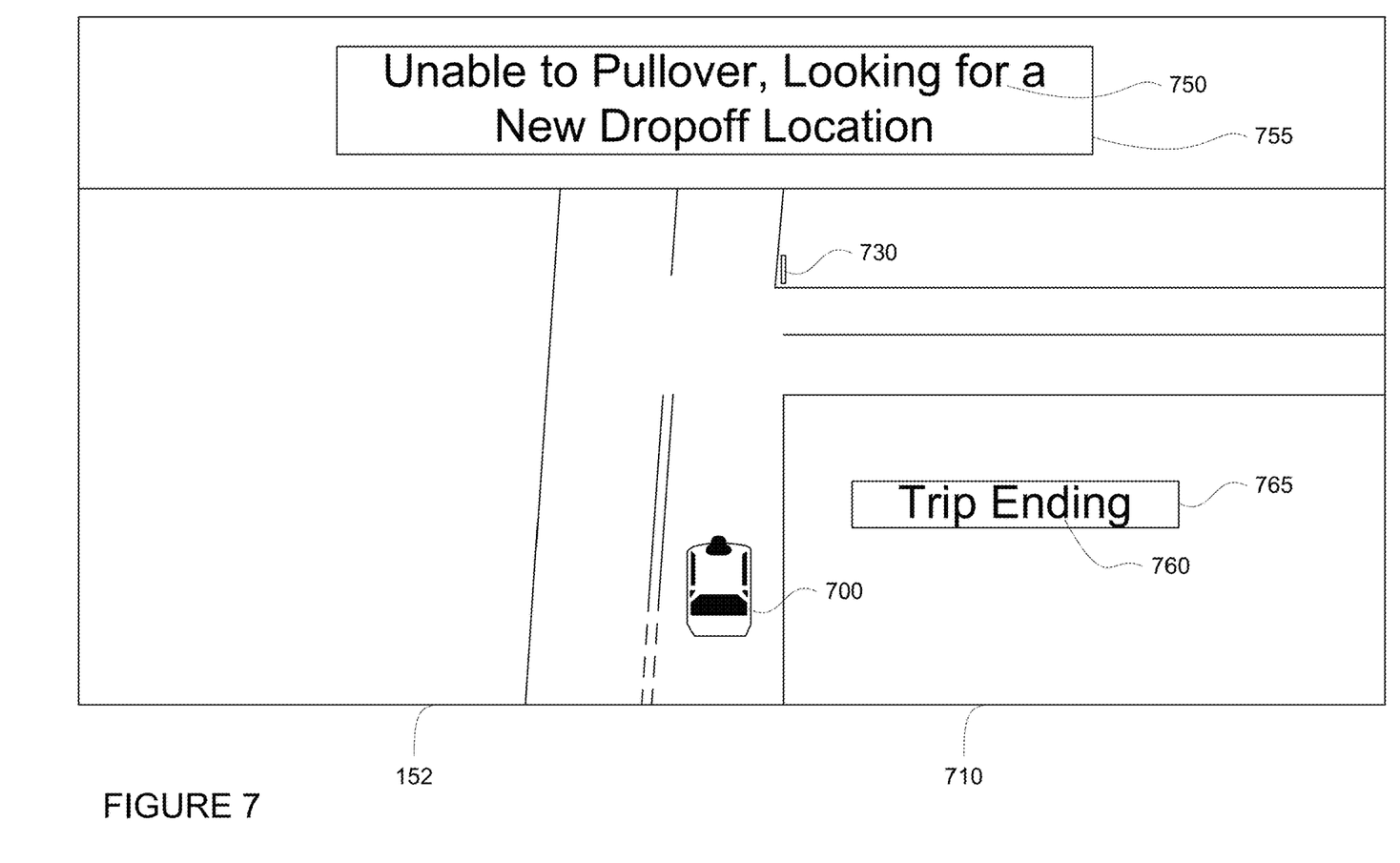
FIG. 7 is an example display including a notification overlaid on a three-dimensional (3D) scene in accordance with aspects of the disclosure.

In some instances, the notifications may be overlaid on a 3D scene of the vehicle's environment which includes representations of the objects identified by the perception system. As shown in FIG. 7, notification 750 is overlaid onto a 3D scene 710 displayed on internal display 152. The 3D scene includes representations of the objects, such as representation 1000 for vehicle 100, representation 700 for vehicle 100 and representation 730 for a stop sign, identified by the perception system 172 which may be combined with map information, such as map information provided by the navigation or positioning systems 168 and 170.

Notifications may include audible notifications. Such audible notifications may inform passengers of the vehicle's actions in the even the passengers cannot see, or are not looking at, the vehicle's display. In this regard, notifications may include an audio component, such as a chime or spoken phrase, in place of a visual component. For instance, an audio notification for a door closing event may be a chime followed by "Door Closed." Such audio notifications may be assigned a ranking and be defined by an event and criteria, as described herein with regard to visual notifications. In certain instances generated audio notifications may be prioritized for playback in the vehicle based on their respective rankings, etc. In some instances notifications may include both audio and visual components.

In some instances, two or more notifications may be displayed or played simultaneously in order to provide the passenger with even more context about the vehicle's 100 operation. In this regard, each cache may be associated with one or more slots (i.e., locations on the vehicle's display where notifications may be displayed). For instance, referring to FIG. 7, the scene may include two slots 755 and 765. Slot 755 may be display notifications from a first assigned cache and slot 765 may display notifications from a second assigned cache. In some instances each slot may have more than one assigned cache and/or have the same assigned cache.

Generated notifications may be assigned to a cache associated with a particular slot. For instance, high priority notifications, such as notification 750, may be assigned to a cache which is assigned to upper slot 755 and lower priority notifications, such as notification 760 may be assigned to a cache which is assigned to lower slot 765. Generated notifications may be assigned to a particular cache based on a criteria or ranking associated with the notification. For instance, urgent notifications may go to a first cache and a second less urgent notification may go to a second cache. In some instances a notification may be assigned to more than one cache. In some examples, a cache may output notifications to more than one slot.

Figure 8:
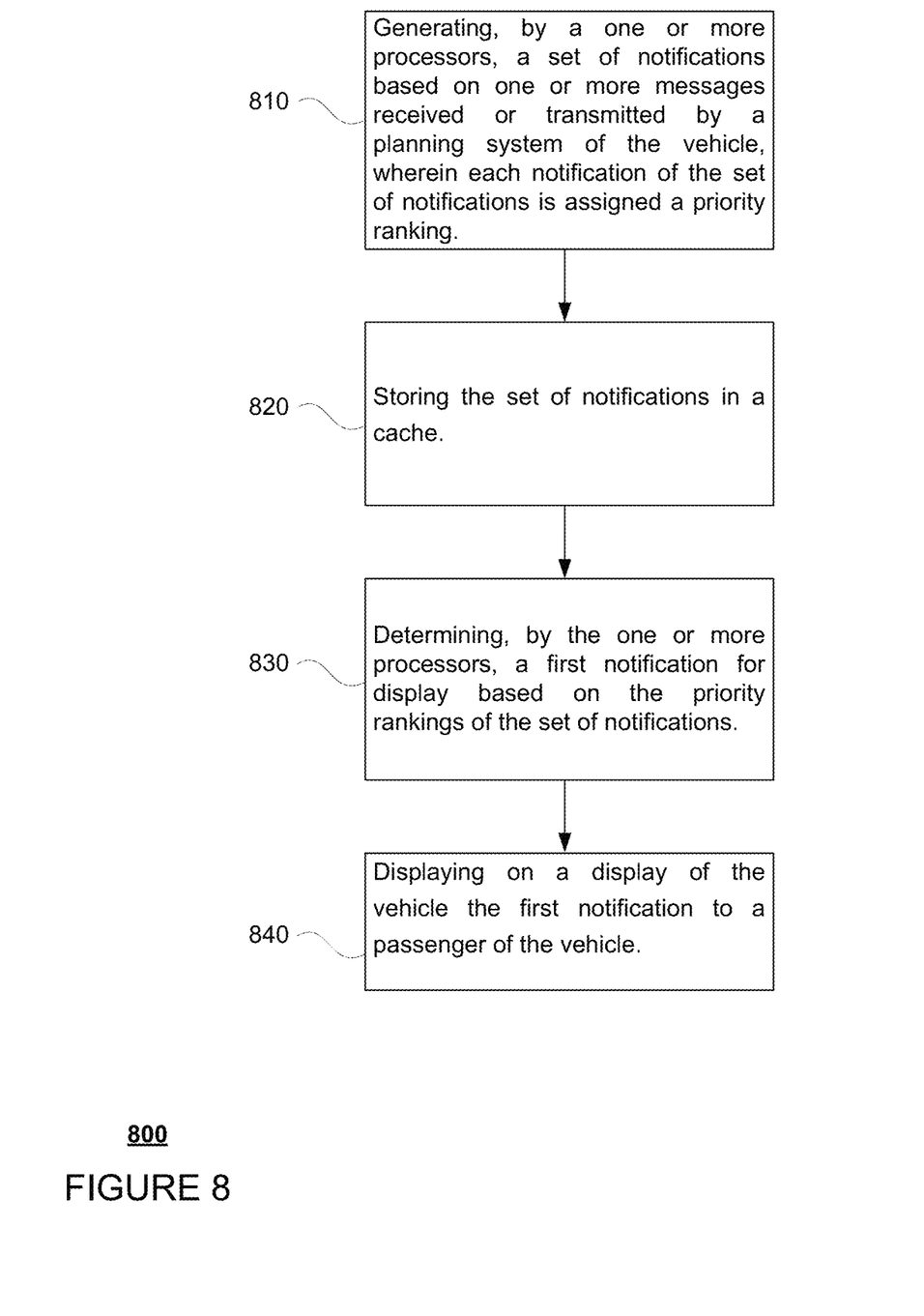
FIG. 8 is an example flow diagram in accordance with aspects of the disclosure.

FIG. 8 is an example flow diagram 800 which may be performed by the planner system 102 in order to prioritize notifications for a vehicle operating in an autonomous driving mode. For instance, at block 810, a set of notifications based on one or more messages received or transmitted by a planning system of the vehicle may be generated. Each notification of the set of notifications may be assigned a priority ranking, as shown at block 820. The set of notifications may be stored in a cache and the one or more processors may determine a first notification for display based on the priority rankings of the set of notifications and the first notification may be displayed on a display of the vehicle to a passenger of the vehicle, as shown in blocks 830 and 840, respectively.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of prioritizing notifications for a vehicle operating in an autonomous driving mode, the method comprising:

generating, by a one or more processors, a set of notifications based on a plurality of different events associated with the vehicle, wherein each notification of the set of notifications is assigned a priority ranking and a display time;

storing the set of notifications in a cache;

determining, by the one or more processors, that one event of the events associated with the vehicle has occurred;

determining, by the one or more processors, a first notification for display based on the determination that the one event has occurred; and displaying on a display of the vehicle the first notification to a passenger of the vehicle for the display time.

2. The method of claim 1, wherein the one event is defined by one or more criteria, and the determination that the one event has occurred includes identifying one or more messages received or transmitted by a planning system of the vehicle that include data which satisfy the one or more criteria.

3. The method of claim 2, further comprising:
monitoring, by the one or more processors, the one or more messages received or transmitted by the planning system of the vehicle.

4. The method of claim 2, further comprising:
detecting, by a perception system, objects external to the vehicle; and
storing information associated with the detected objects in a memory comprising the cache.

5. The method of claim 4, wherein the direction and the speed of the vehicle is controlled by the planning system based on the stored information associated with the detected objects.

6. The method of claim 1, wherein each notification of the set of notifications is further assigned one or more of a visual component and an expiration time.

7. The method of claim 6, wherein the visual component of at least one of the notifications in the set of notifications includes text or images associated with an object or individual which performed the one event.

8. The method of claim 6, wherein the visual component includes text or images for display on the display of the vehicle.

9. The method of claim 6, wherein the expiration time is the length of time the respective notification is stored in the cache.

10. The method of claim 1, wherein the display time is the length of time the respective notification is displayed.

11. The method of claim 10, further comprising:
generating a second notification, the second notification having a higher priority ranking than the first notification; and
displaying the second notification on the display before the display time of the first notification is completed.

12. The method of claim 1, further comprising, removing the first notification from the cache upon the first notification being displayed.

13. The method of claim 1, wherein the determining the first notification for display includes determining that the first notification for display has a higher priority ranking than the priority rankings of the other notifications in the set of notifications.

14. The method of claim 1, wherein the cache is associated with one or more vehicle notification locations on the display.

15. The method of claim 14, wherein the cache outputs notifications to more than one vehicle notification locations on the display.

16. The method of claim 1, wherein the one event relates to an ending of a trip.

17. The method of claim 1, wherein the one event relates to changing a route while a trip is progressing.

18. The method of claim 1, wherein the one event relates to a dispatching message.

19. The method of claim 1, wherein the one event relates to the vehicle being unable to pull over.

20. A system for prioritizing notifications for a vehicle operating in an autonomous driving mode, the system comprising one or more processors configured to:
generate a set of notifications based on a plurality of different events associated with the vehicle, wherein each notification of the set of notifications is assigned a priority ranking and a display time;
store the set of notifications in a cache;
determine that one event of the events associated with the vehicle has occurred;
determine a first notification for display based on the determination that the one event has occurred; and
display on a display of the vehicle the first notification to a passenger of the vehicle for the display time.

21. The system of claim 20, wherein the one event is defined by one or more criteria, and the determination that the one event has occurred includes identifying one or more messages received or transmitted by a planning system of the vehicle that include data which satisfy the one or more criteria.

22. The system of claim 21, further comprising:
a perception system configured to detect objects external to the vehicle,
wherein information associated with the detected objects is stored in a memory comprising the cache.

23. The system of claim 22, wherein direction and speed of the vehicle is controlled by the planning system based on the stored information associated with the detected objects.

24. The system of claim 20, wherein each notification of the set of notifications is further assigned one or more of a visual component and an expiration time.

25. The system of claim 24, wherein the visual component includes text or images for display on the display of the vehicle.

26. The system of claim 20, wherein the display time is the length of time the respective notification is displayed.

27. The system of claim 20, wherein the cache is associated with one or more vehicle notification locations on the display.

28. The system of claim 27, wherein the cache outputs notifications to more than one vehicle notification locations on the display.

* * * * *